(12) United States Patent　　(10) Patent No.: US 8,804,204 B2
Hayashi　　(45) Date of Patent: Aug. 12, 2014

(54) PASSWORD GENERATING SYSTEM AND METHOD, AND NON-TRANSITORY COMPUTER READABLE MEDIUM

(71) Applicant: Fuji Xerox Co., Ltd., Tokyo (JP)

(72) Inventor: Manabu Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/768,795

(22) Filed: Feb. 15, 2013

(65) Prior Publication Data

US 2014/0043654 A1　　Feb. 13, 2014

(30) Foreign Application Priority Data

Aug. 13, 2012　(JP) ................................. 2012-179365

(51) Int. Cl.
*H04N 1/40*　(2006.01)
(52) U.S. Cl.
USPC ......................................... 358/3.28; 358/3.31
(58) Field of Classification Search
USPC ....................... 358/3.28, 1.4, 3.31
See application file for complete search history.

(56) References Cited

FOREIGN PATENT DOCUMENTS

| JP | 2008-201065 A | 9/2008 |
|---|---|---|
| JP | 2009-187260 A | 8/2009 |

*Primary Examiner* — Barbara Reinier
(74) *Attorney, Agent, or Firm* — Sughrue Mion, PLLC

(57) ABSTRACT

A password generating system includes a scanner, a coordinate obtaining unit, a writing information obtaining unit, a track obtaining unit, a dividing unit, a converter, and an output unit. The scanner includes a stylus part performing writing on a print medium with a code indicating coordinates in a password setting region. The scanner scans the code. The coordinate obtaining unit obtains the coordinates from the code. The writing information obtaining unit obtains writing information specifying the order of writing. The track obtaining unit obtains the track of writing based on the obtained coordinates and writing information. The dividing unit divides obtained tracks into units convertible to symbols. The converter converts the track in each unit into a symbol. The output unit obtains a symbol string by arranging obtained symbols in an order based on the order of writing, and outputs the symbol string as a password.

20 Claims, 19 Drawing Sheets

FIG. 10

```
                                          300
    ┌─────────────────────────────┐
    │       APPLICATION FORM       │
    │                              │
    │  TYPE      ☐ NEW  ☐ ADDITION │
    │                              │
    │  PLAN NAME    [         ]    │
    │                              │
    │  INITIAL      [      ]─ 301  │
    │  PASSWORD                    │
    │                              │
    │  ADDRESS      [         ]    │
    │                              │
    │  NAME         [      ]       │
    └─────────────────────────────┘
```

FIG. 11

| REGION NAME | OCR RESULT | ORDER OR WRITING |
|---|---|---|
| A | 1 | 5 |
| B | 6 | 1 |
| C | 3 | 6 |
| D | 4 | 2 |
| E | 3 | 3 |
| F | 2 | 7 |
| G | 7 | 8 |
| H | 2 | 9 |
| I | 9 | 4 |

PASSWORD GENERATING SYSTEM AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-179365 filed Aug. 13, 2012.

BACKGROUND

1. Technical Field

The present invention relates to a password generating system and method and to a non-transitory computer readable medium.

2. Summary

According to an aspect of the invention, there is provided a password generating system including a scanner, a coordinate obtaining unit, a writing information obtaining unit, a track obtaining unit, a dividing unit, a converter, and an output unit. The scanner includes a stylus part that performs writing on a print medium on which a code indicating coordinates is added at least to a password setting region. The scanner scans the code at a writing position at the time of writing performed with the stylus part in the password setting region. The coordinate obtaining unit obtains the coordinates from the code. The writing information obtaining unit obtains writing information that specifies the order of writing. The track obtaining unit obtains the track of writing in the password setting region, on the basis of the coordinates obtained by the coordinate obtaining unit and the writing information obtained by the writing information obtaining unit. The dividing unit divides multiple tracks obtained by the track obtaining unit into units convertible to symbols. The converter converts the track in each of the units, obtained by division performed by the diving unit, into a symbol. The output unit obtains a symbol string by arranging multiple symbols, obtained by conversion performed by the converter, in an order based on the order of writing, and outputs the symbol string as a password.

BRIEF DESCRIPTION OF THE DRAWINGS

Exemplary embodiments of the present invention will be described in detail based on the following figures, wherein:

FIG. 10 is a diagram illustrating an example of an information entry form whose image is formed on a medium by the image forming apparatus;

FIG. 11 is a diagram illustrating an example of a password entry area formed on the information entry form;

DETAILED DESCRIPTION

Exemplary embodiments will be described with reference to the drawings.

First Exemplary Embodiment

In a first exemplary embodiment, an image processing system is discussed.

Configuration

Figure 1:
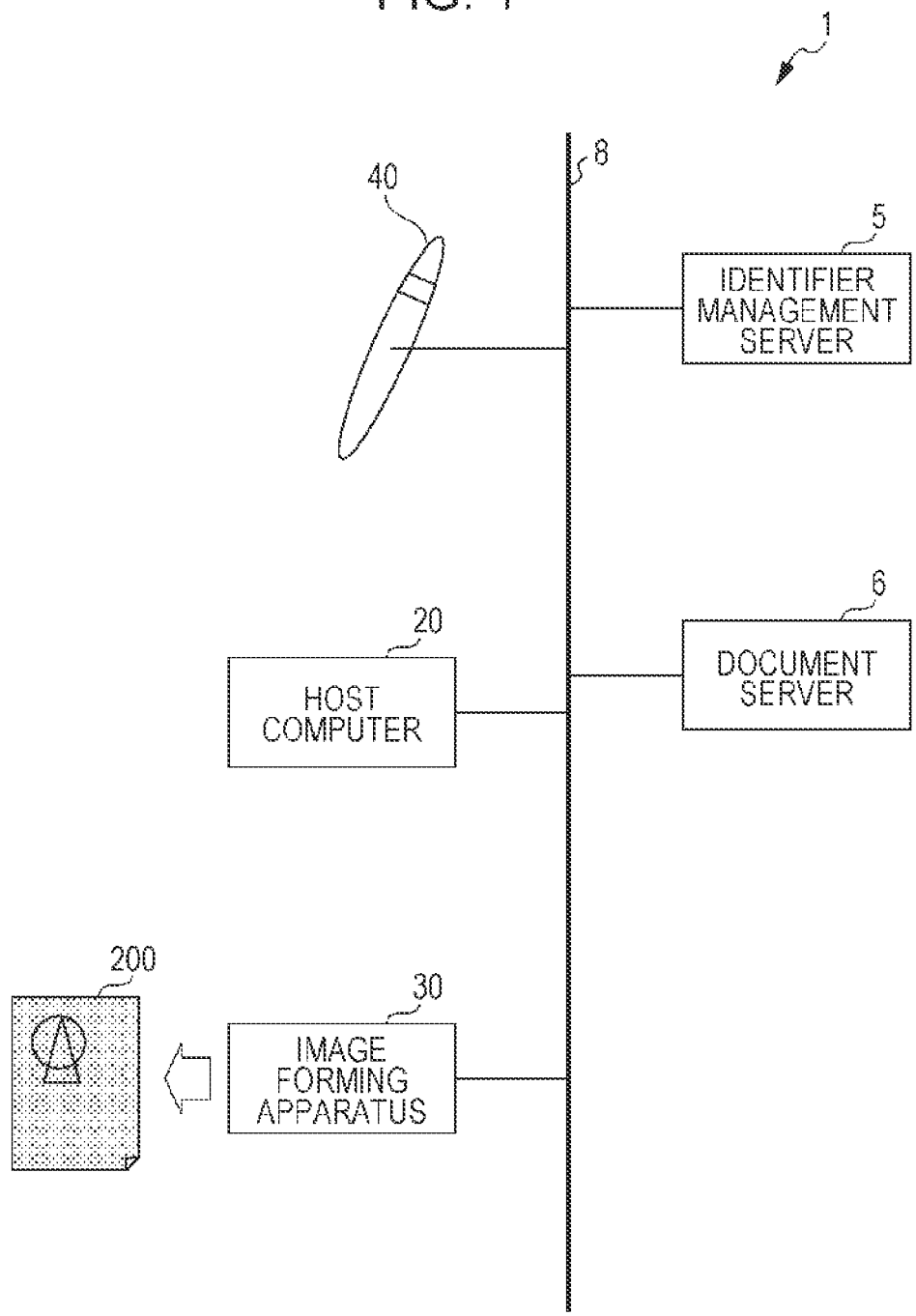
FIG. 1 is a diagram illustrating an example of the configuration of an image processing system according to a first exemplary embodiment.

FIG. 1 is a diagram illustrating an example of the configuration of an image processing system 1 according to the first exemplary embodiment.

As illustrated in FIG. 1, the image processing system 1 includes a host computer 20, an image forming apparatus 30, a digital pen 40, an identifier management server 5, and a document server 6. These elements are interconnected via a communication device 8 such as a local area network (LAN) or the Internet.

With the host computer 20, a user may generate a document, a figure, or the like by using application or the like. In response to a request from the user, the host computer 20 issues a print request to the image forming apparatus 30 to form an image of document data, graphic data, or the like, which is input or generated by the user, on a medium 200 such as a sheet. In this exemplary embodiment, the host computer 20 also saves and processes information received from the digital pen 40.

Figure 2:
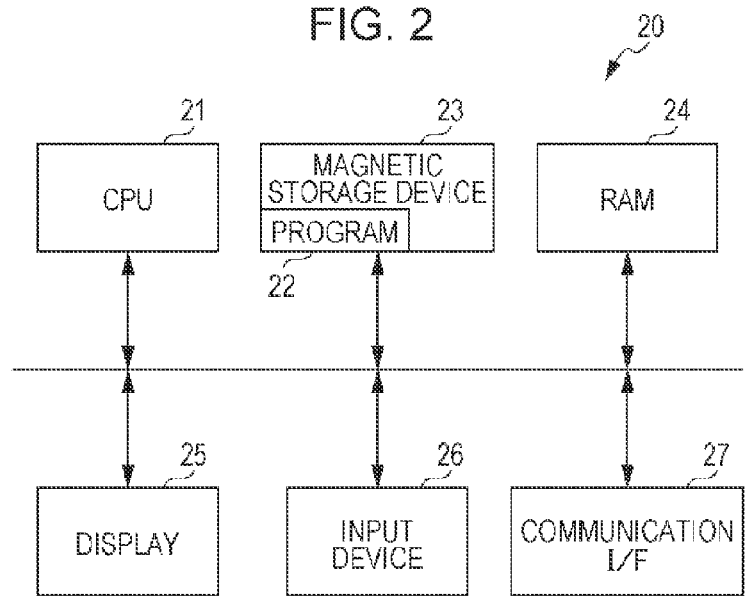
FIG. 2 is a block diagram illustrating an example of electrical connection of a host computer.

FIG. 2 is a block diagram illustrating an example of electrical connection of the host computer 20.

As illustrated in FIG. 2, the host computer 20 includes a central processing unit (CPU) 21 that performs various arithmetic operations and controls the individual elements in a concentrated manner. Here, a magnetic storage device 23 that stores a program 22 executed by the CPU 21 and various data such as fixed data, a random-access memory (RAM) 24 serving as a work area for the CPU 21, a display 25, an input device 26 such as a keyboard and a mouse, and a communication interface (I/F) 27 that performs communication with the communication device 8 are connected to the CPU 21.

Here, the program 22 may be stored on the magnetic storage device 23 at the time the host computer 20 is shipped. Alternatively, the program 22 may be read from a storage medium removably attached to the host computer 20 by the user or the like after the shipment and may be read and stored on the magnetic storage device 23.

Although described in detail later, in this exemplary embodiment, the host computer 20 issues a print instruction of an information entry form to the image forming apparatus 30, and generates a password on the basis of stroke information transferred from the digital pen 40 at the time the user writes a password on the information entry form with the digital pen 40.

The image forming apparatus 30 forms an image on the medium 200 such as a sheet.

Figure 3:
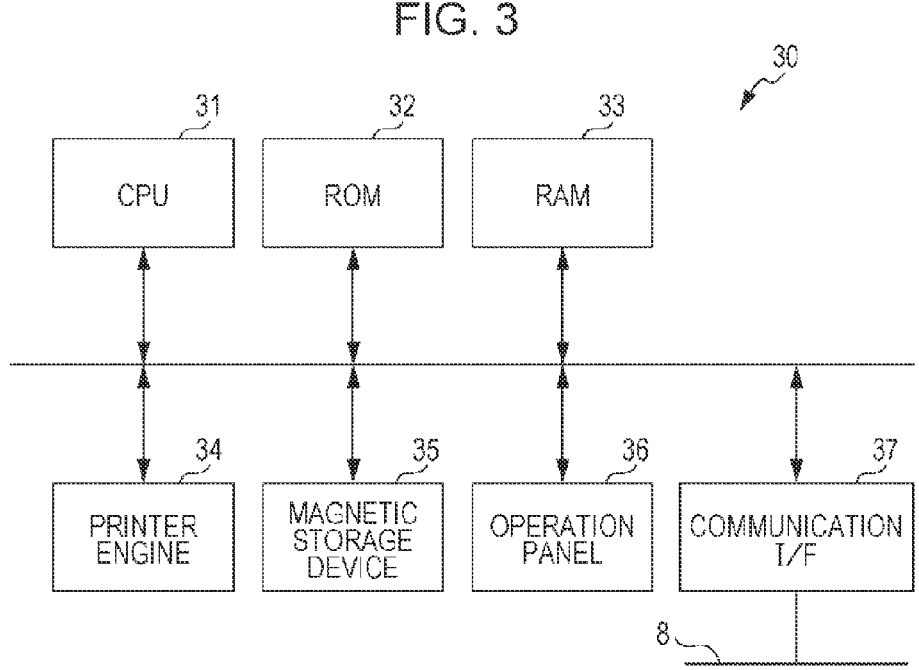
FIG. 3 is a block diagram illustrating an example of electrical connection of an image forming apparatus.

FIG. 3 is a block diagram illustrating an example of electrical connection of the image forming apparatus 30.

As illustrated in FIG. 3, the image forming apparatus 30 includes a CPU 31 that performs various arithmetic operations and controls the individual elements in a concentrated manner, a read-only memory (ROM) 32 that stores various control programs executed by the CPU 31 and fixed data, and a RAM 33 serving as a work area for the CPU 31. These elements are interconnected. Further, a printer engine 34 that forms an image on the medium 200 such as a sheet, a magnetic storage device 35 that stores document data or the like, an operation panel 36 on which the user performs various operations, and a communication I/F 37 that performs communication with the communication device 8 are connected to the CPU 31. Although the printer engine 34 forms an image by using an electrophotographic system in this example, the printer engine 34 may form an image by using other systems such as an inkjet system.

Although described in detail later, in this exemplary embodiment, the image forming apparatus 30 generates a two-dimensional code image, combines the information entry form and the two-dimensional code image, outputs a composite image, and the like.

The identifier management server 5 is a server for managing identifiers used in the image processing system 1. The identifier management server 5 manages multiple identifiers. In this exemplary embodiment, the identifier management server 5 at least manages, as an identifier, a sheet identification (ID) for identifying a sheet (medium) on which an image is formed.

The document server 6 is a server for managing document data. The document server 6 performs processing such as storing document data, received from the host computer 20, and the document ID of this document data in an associated manner.

During writing performed on the medium 200, the digital pen 40 scans a two-dimensional code image formed on (that is, combined with) the medium 200, and transmits information scanned from the two-dimensional code image to the host computer 20.

Figure 4:
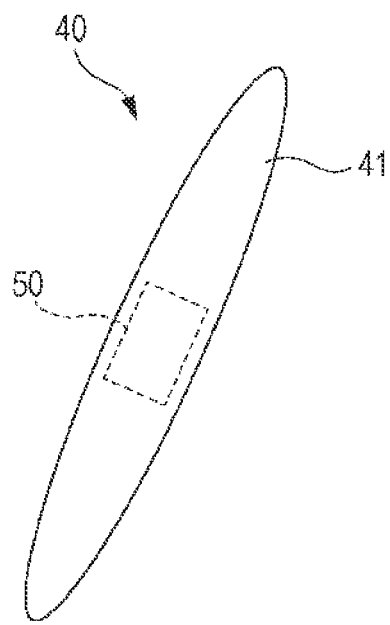
FIG. 4 is a perspective view illustrating an example of the configuration of a digital pen.

FIG. 4 is a perspective view illustrating an example of the configuration of the digital pen 40.

As illustrated in FIG. 4, the digital pen 40 includes a stylus body 41 for writing on the medium 200. The stylus body 41 includes a built-in processor 50.

Figure 5:
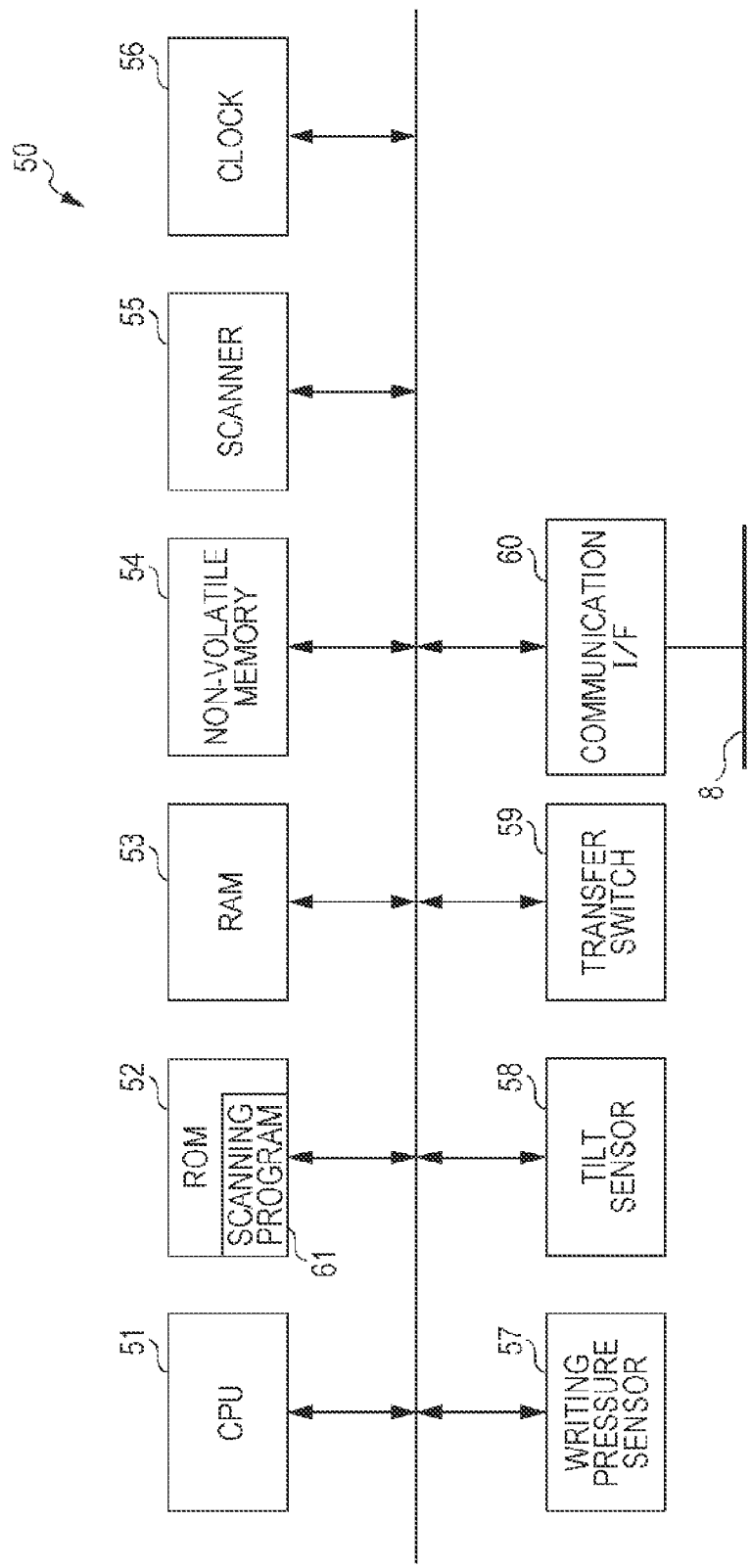
FIG. 5 is a block diagram illustrating an example of electrical connection of a processor of the digital pen.

FIG. 5 is a block diagram illustrating an example of electrical connection of the processor 50 of the digital pen 40.

As illustrated in FIG. 5, the processor 50 includes a CPU 51 that performs various arithmetic operations and controls the individual elements in a concentrated manner, a ROM 52 that stores various control programs executed by the CPU 51 and fixed data, a RAM 53 serving as a work area for the CPU 51, and a non-volatile memory 54. These elements are interconnected. Also, the processor 50 includes a scanner 55 for scanning a two-dimensional code image (details thereof will be described later) which is an image of a two-dimensional code that is a code whose image is formed by the image forming apparatus 30 on the medium 200, a clock 56, a writing pressure sensor 57 that detects the writing pressure of the stylus body 41, a tilt sensor 58 that detects the tilt of the stylus body 41, a transfer switch 59, and a communication I/F 60 that performs communication via the communication device 8. These elements are connected to the CPU 51. Also, the ROM 52 stores a scanning program 61 that is a control program of the digital pen 40.

Here, the scanning program 61 may be stored in the ROM 52 at the time the digital pen 40 is shipped. Alternatively, the scanning program 61 may be read from a storage medium removably attached to the digital pen 40 by the user or the like after the shipment and may be read and stored on a writable memory.

Figure 6:
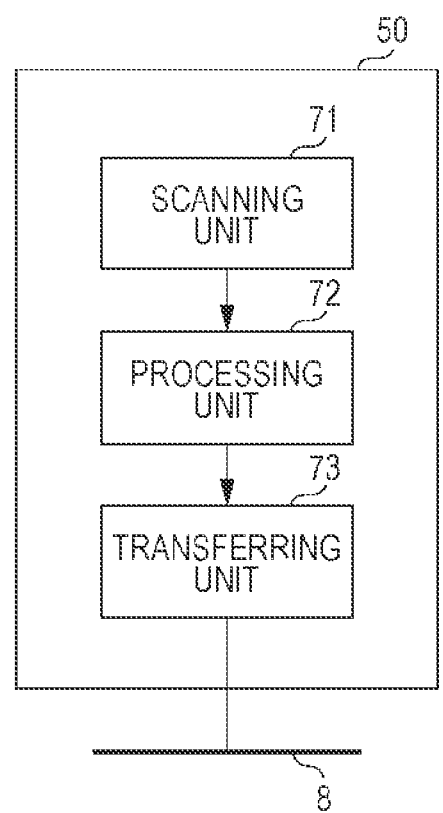
FIG. 6 is a functional block diagram of processing executed by the processor of the digital pen.

FIG. 6 is a functional block diagram of processing executed by the processor 50 of the digital pen 40.

As illustrated in FIG. 6, the processor 50 includes, as functions, a scanning unit 71, a processing unit 72, and a transferring unit 73. Here, the scanning unit 71 scans, with the scanner 55, a two-dimensional code image on the medium 200. The processing unit 72 obtains information from the two-dimensional code image scanned by the scanning unit 71. Here, the obtained information is coordinate information that indicates the coordinate position on the medium 200, a transfer destination (transfer destination specifying information), and the like. The transferring unit 73 transfers the coordinate information and the like, obtained by the processing unit 72, to a predetermined transfer destination by using the communication I/F 60.

In the above-described image processing system 1, the digital pen 40 may transfer a password written on the medium 200, with which a two-dimensional code image including coordinate information is combined, to a transfer destination in response to writing of the password performed with the digital pen 40 on the medium 200. Accordingly, for example, a password written on a bank application form may be transferred to a transfer destination at the time the password is written on the form, or an initial password written on a system usage application form may be transferred to a transfer destination at the time the password is written on the form.

However, because the written password is left on the medium 200, the third person may easily know the password by looking at the written password left on the medium 200.

Here, for example, in Japanese Unexamined Patent Application Publication No. 2009-187260, hand-writing information is encrypted in order to hide data. However, in Japanese Unexamined Patent Application Publication No. 2009-187260, although the hand-writing information being transferred is hidden, symbols written on a sheet are left. Thus, the hand-writing information is recognizable by looking at the sheet. In Japanese Unexamined Patent Application Publication No. 2008-201065, in order to hide the written details, printing with a special ink, namely, an infrared-non-absorbing ink, is necessary. Also in Japanese Unexamined Patent Application Publication No. 2008-201065, the written details are not completely kept out of sight.

In contrast, in this exemplary embodiment, a password that is difficult to be estimated from a written result left on a medium is generated by the following configuration and processing.

Firstly, a form generating process performed by the host computer 20 in this exemplary embodiment will be described. With this form generating process, the host computer 20 generates a password entry area in which a password is written, on an information entry form whose image is formed on a medium.

Figure 7:
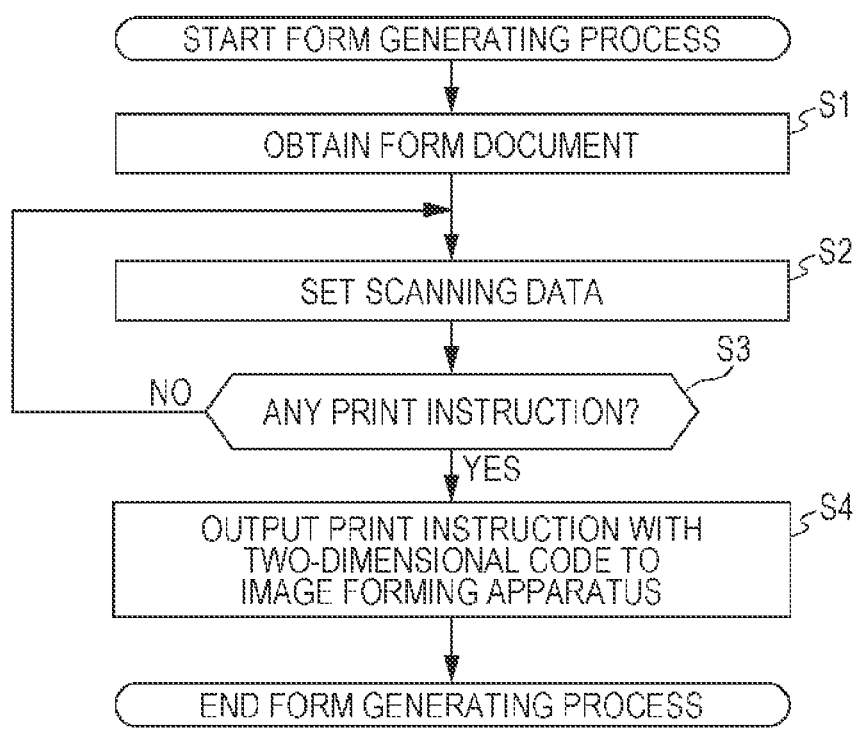
FIG. 7 is a flowchart illustrating an example of a form generating process.

FIG. 7 is a flowchart illustrating an example of the form generating process.

As illustrated in FIG. 7, firstly in step S1, the host computer 20 obtains a form document serving as the base of an information entry form. For example, the host computer 20 reads a file saved in a specific format (such as in extensible markup language paper specification (XPS) or portable document format (PDF)), and obtains a form document.

Next in step S2, the host computer 20 performs settings for scanning data in order to scan written data on the form document obtained in step S1, on the basis of information input from the user (such as information input with application).

Specifically, the data scanning settings performed by the host computer 20 on the basis of information input from the user include the settings of a name that identifies data to be scanned (hereinafter referred to as "data identifying name"), an entry range of data to be scanned (hereinafter referred to as "data entry range"), and the type of data (hereinafter referred to as "data type"). For example, the host computer 20 sets the data entry range as a rectangular shape on the basis of information input from the user. Also, for example, the host computer 20 sets the data type to one of "characters", "check", and "graphic" on the basis of information input from the user.

In this exemplary embodiment, further, the data scanning settings performed on the basis of information input from the user include the setting of a password entry area. Specifically, the host computer 20 sets the data entry range of the password entry area for writing a password as a rectangular shape, on the basis of information input from the user. At this time, the host computer 20 divides the password entry area into multiple regions, and sets data entry ranges. Here, the arrangement of the password entry area and the number of regions of the password entry area may be automatically determined by application, or may be determined by the user by operating application. Also, the host computer 20 sets the type of characters usable in a password, and the password length, on the basis of information input from the user.

Next in step S3, the host computer 20 determines whether a print instruction is given from the user. That is, the host computer 20 determines whether the input device 26 is operated by the user to give a print instruction. When it is determined that no print instruction is given, the host computer 20 starts the process again from step S2. That is, the host computer 20 continues performing the data scanning settings. When it is determined that a print instruction is given, the host computer 20 proceeds to step S4.

In step S4, the host computer 20 outputs the print instruction with a two-dimensional code to the image forming apparatus 30. The host computer 20 ends the process illustrated in FIG. 7.

Here, the print instruction with a two-dimensional code is a print instruction generated by adding information indicating printing with a two-dimensional code (hereinafter referred to as "code-added print instruction information") and a sheet ID to a general print instruction.

The details of the form generating process are as described above.

Also, the host computer 20 performs the following processing in this form generating process.

The host computer 20 obtains a sheet ID to be included in a print instruction from the identifier management server 5. For example, the host computer 20 transmits an identifier obtaining request to the identifier management server 5, thereby obtaining an identifier sent back from the identifier management server 5 as a sheet ID.

Also, the host computer 20 transmits information entry form data and a sheet ID to be included in a print instruction to the document server 6. Accordingly, the document server 6 holds and manages the information entry form data and the sheet ID, transmitted from the host computer 20, in an associated manner.

Next, a printing process performed by the image forming apparatus 30 will be described.

Figure 8:
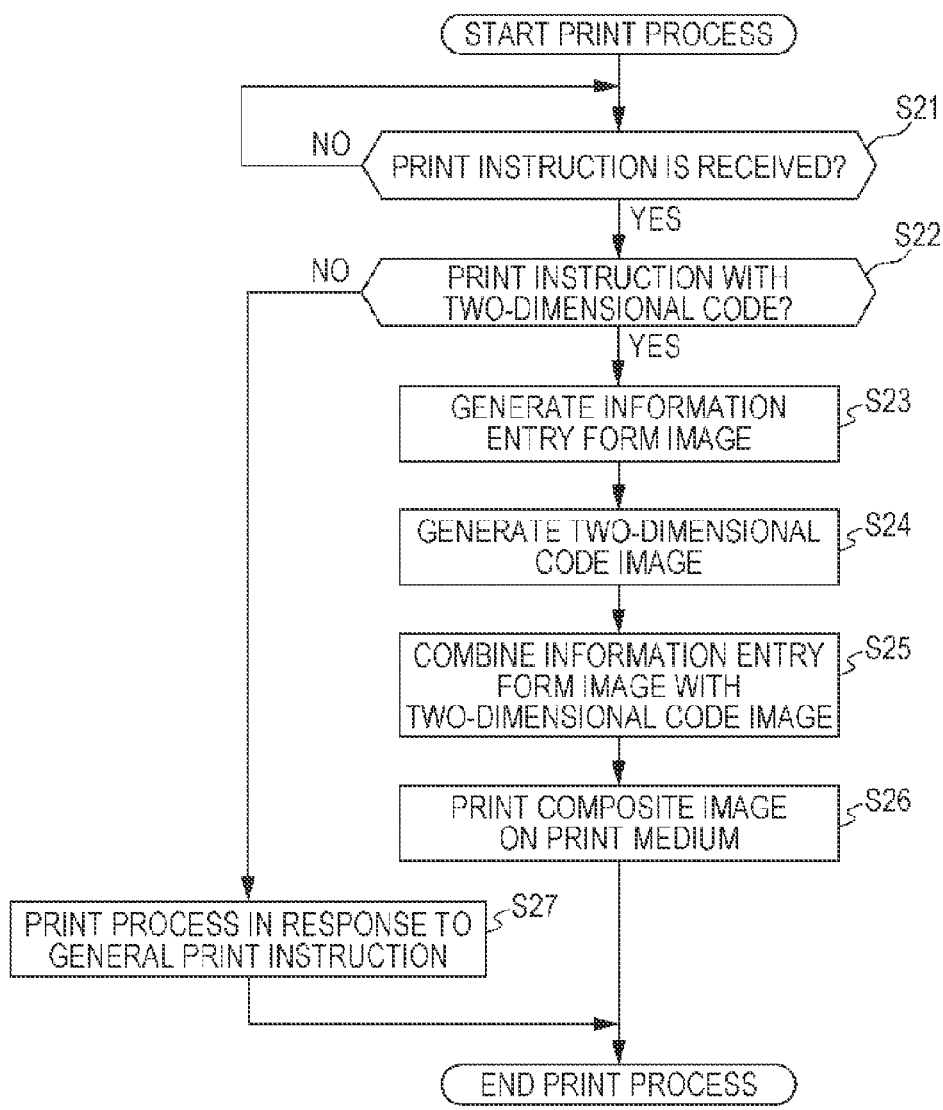
FIG. 8 is a flowchart illustrating an example of a printing process.

FIG. 8 is a flowchart illustrating an example of the printing process.

As illustrated in FIG. 8, firstly in step S21, the image forming apparatus 30 determines whether a print instruction from the host computer 20 is received. When the image forming apparatus 30 determines that a print instruction from the host computer 20 is received, the image forming apparatus 30 proceeds to step S22.

In step S22, the image forming apparatus 30 determines whether the received print instruction is a print instruction with a two-dimensional code. Specifically, the image forming apparatus 30 determines, on the basis of information added to the print instruction, whether a print instruction regarding the print instruction is a print instruction with a two-dimensional code. Accordingly, when the image forming apparatus 30 determines that code-added print instruction information is added to the print instruction, the image forming apparatus 30 determines that the print instruction is a print instruction with a two-dimensional code. When the image forming apparatus 30 determines that the print instruction is a print instruction with a two-dimensional code, the image forming apparatus 30 proceeds to step S23. When the image forming apparatus 30 determines that the print instruction is not a print instruction with a two-dimensional code, that is, when the print instruction is a general print instruction, the image forming apparatus 30 proceeds to step S27.

In step S27, the image forming apparatus 30 performs general printing in response to the print instruction. The image forming apparatus 30 ends the process illustrated in FIG. 8.

In step S23, the image forming apparatus 30 generates an information entry form image on the basis of information entry form data included in the print instruction.

In step S24, the image forming apparatus 30 generates a two-dimensional code image. Here, a two-dimensional code image is a pattern image including a two-dimensional code. In this exemplary embodiment, a two-dimensional code image includes various types of information, such as a sheet ID included in the print instruction and the coordinates on a medium.

Figure 9:
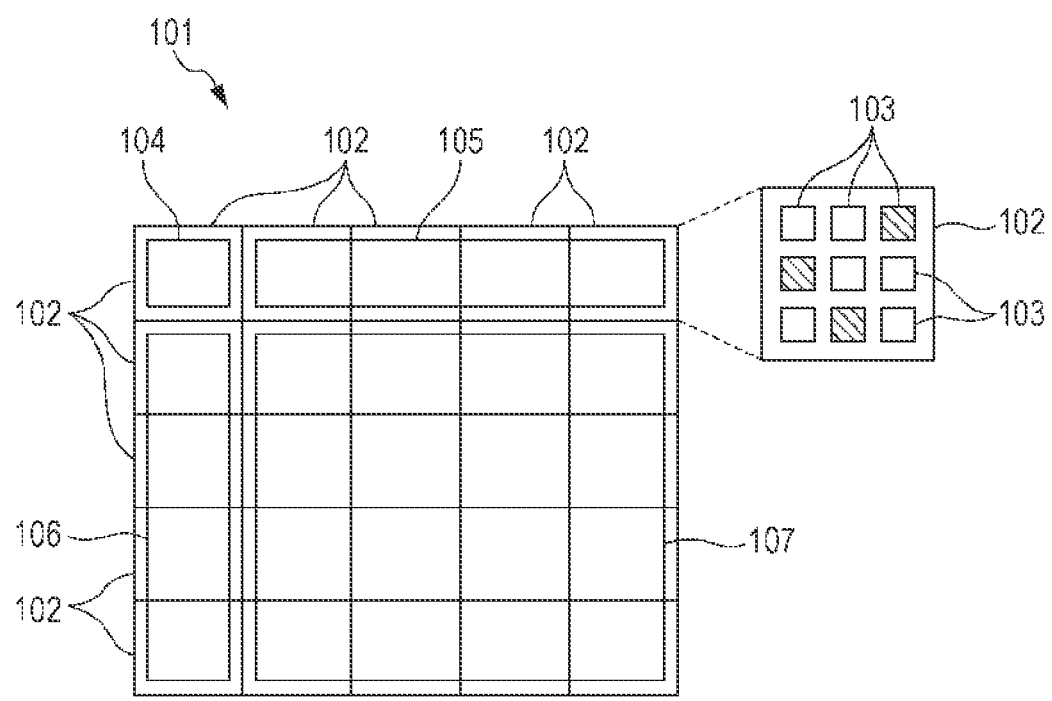
FIG. 9 is a diagram illustrating an example of the configuration of a two-dimensional code image (specifically one unit of the two-dimensional code image)

FIG. 9 illustrates an example of the configuration of a two-dimensional code image (specifically one unit of the two-dimensional code image) in this exemplary embodiment.

As illustrated in FIG. 9, a two-dimensional code image 101 includes 5×5 (25) blocks 102. Further, each of the blocks 102 includes a combination of 3×3 (9) toner images 103. The two-dimensional code image 101 displays information by turning ON (there is an image) or OFF (there is no image) of the 3×3 toner images 103. For example, in each of the blocks 102, the number of toner images 103 that are turned ON is always three.

The two-dimensional code image 101 is divided into a pattern specifying block (pattern specifying region) 104, X-coordinate blocks (X-coordinate region) 105, Y-coordinate blocks (Y-coordinate region) 106, and information type blocks (information type region) 107. Here, the pattern specifying block is one block 102 positioned in the corner of the two-dimensional code image 101. In FIG. 9, the pattern specifying block 104 is positioned in the upper left corner of the two-dimensional code image 101. The pattern specifying block 104 indicates that this pattern specifying block 104 is the position of the upper left corner of one two-dimensional code image 101. That is, the pattern specifying block 104 serves as the reference position in the two-dimensional code image 101. Also, the X-coordinate blocks 105 are four blocks 102 positioned to the right of the pattern specifying block 104 in the two-dimensional code image 101 in FIG. 9. The two-dimensional code image 101 indicates coordinate information of the X-coordinate by using the X-coordinate blocks 105. Also, the Y-coordinate blocks 106 are four blocks 102 positioned on the underside of the pattern specifying block 104 in the two-dimensional code image 101 in FIG. 9. The two-dimensional code image 101 indicates coordinate information of the Y-coordinate by using the Y-coordinate blocks 106. Also, the information type blocks 107 are 16 blocks 102 that are not assigned as the pattern specifying block 104, the X-coordinate blocks 105, or the Y-coordinate blocks 106 in the two-dimensional code image 101. The two-dimensional code image 101 indicates information such as a sheet ID by using the information type blocks 107.

The two-dimensional code image illustrated in FIG. 9 is one that simply indicates a coordinate on a medium, that is, only one unit of the two-dimensional code image. Thus, the image forming apparatus 30 generates a code image that is capable of specifying all the coordinates on a medium, in which the two-dimensional code image illustrated in FIG. 9 serves as one unit.

Next in step S25, the image forming apparatus 30 combines the information entry form image, generated in step S23, and the two-dimensional code image, generated in step S24.

Next in step S26, the image forming apparatus 30 forms the composite image, obtained in step S25, on a medium. The image forming apparatus 30 ends the process illustrated in FIG. 8. Accordingly, the two-dimensional code image is combined with the information entry form image on the medium.

The details of the printing process are as described above.

FIG. 10 illustrates an example of an information entry form 300 whose image is generated by the image forming apparatus 30 on a medium on the basis of a print instruction from the host computer 20. Thus, the information entry form 300 illustrated in FIG. 10 is constituted on the basis of the data scanning settings performed by the host computer 20. That is, data entry ranges of "new" and "addition" of "type", "plan name", "initial password", "address", and "name" are generated as rectangular shapes on the information entry form 300. The data type of "new" and "addition" of "type" is "check". The data type of "plan name", "initial password", "address", and "name" is "characters". The information entry form 300 includes information of these data types in two-dimensional code images (specifically, information type blocks 107 thereof) combined in corresponding data entry ranges. For example, a "password" may be included as a data identifying name in a two-dimensional code image combined in a password entry area 301 that is the data entry range of the "initial password", and the type of characters usable in a password and the password length may also be included.

FIG. 11 illustrates an example of the password entry area 301 formed on the information entry form 300.

As illustrated in FIG. 11, the password entry area 301 is divided into nine (=3×3) regions (hereinafter may also be referred to as "divided regions") in response to, for example, an instruction from the user on the host computer 20.

Next, processing at the time writing is performed with the digital pen 40 on the above-described information entry form 300 will be described.

During writing, the digital pen 40 scans data on the information entry form 300 by using the scanner 55. At this time, the scanner 55 scans two-dimensional code images combined with the information entry form 300. The digital pen 40 transmits the information, scanned by the scanner 55, as stroke information to the host computer 20.

Figure 12:
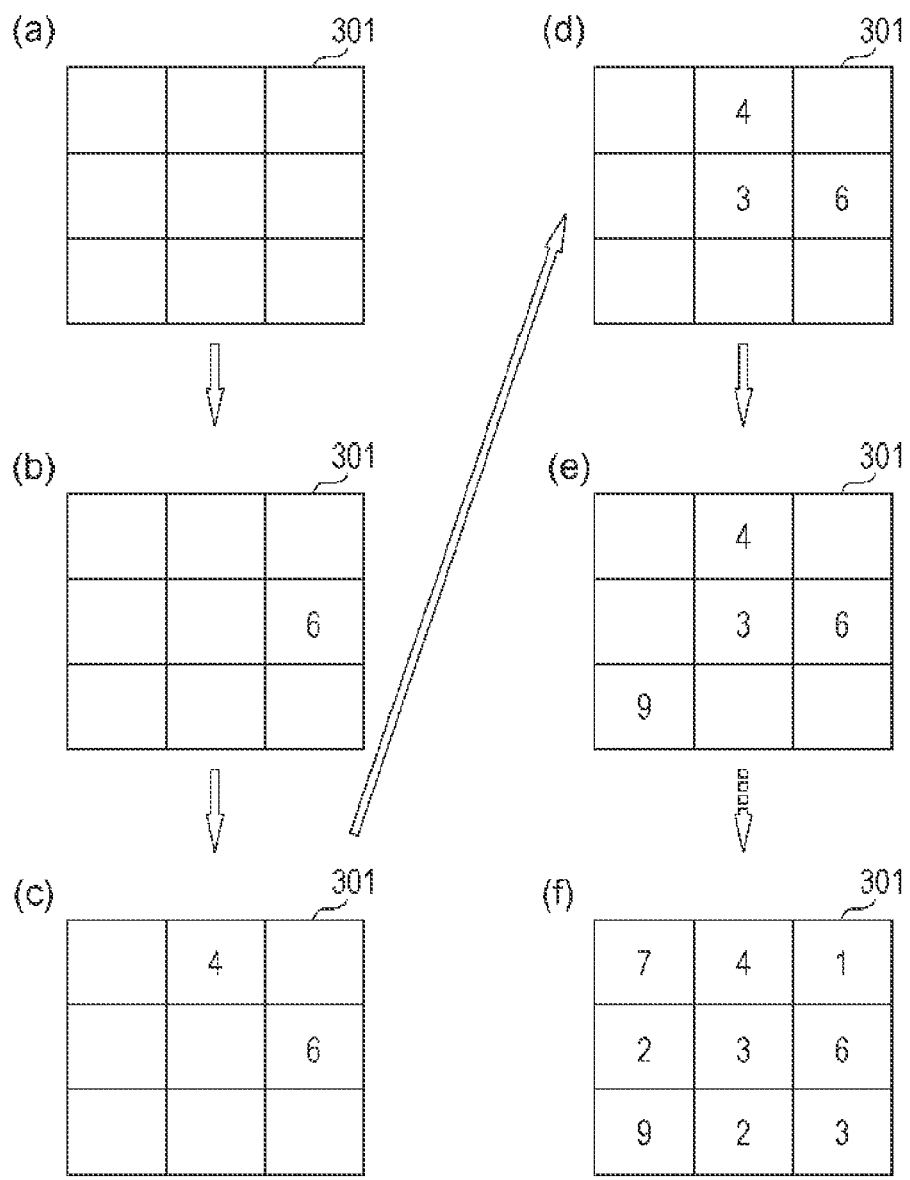
FIG. 12 includes diagrams illustrating an example of writing performed by a user in the password entry area.

Here, the case in which the user performs writing with the digital pen 40 in the password entry area 301 in the example illustrated in FIG. 11 will be described by way of example. FIG. 12 illustrates an example in which the user writes a password in the password entry area 301.

As illustrated as changes from portions (a) to (f) of FIG. 12, the user writes numerals in the individual regions (hereinafter referred to as "divided regions") in the password entry area 301 by using the digital pen 40, one character at a time. In this example, the user writes numerals in the individual regions of the password entry area 301, one character at a time, in the following order: "6", "4", "3", "9", . . . . During this writing, the digital pen 40 scans a two-dimensional code image on the information entry form 300 by using the scanner 55, and transmits information obtained from the scanned two-dimensional code as stroke information to the host computer 20.

Figure 13:
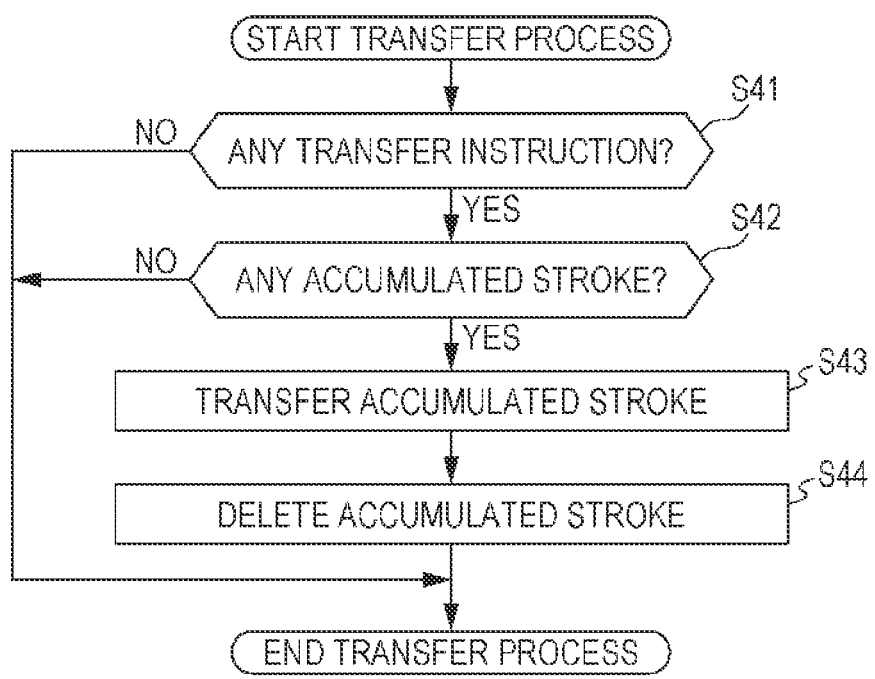
FIG. 13 is a flowchart illustrating an example of a stroke information transferring process.

FIG. 13 illustrates a flowchart of an example of a stroke information transferring process performed by the digital pen 40 (specifically the CPU 51).

As illustrated in FIG. 13, firstly in step S41, the CPU 51 determines whether there is a transfer instruction. Here, when the transfer switch 59 is operated, the CPU 51 determines that there is a transfer instruction. When the CPU 51 determines that there is a transfer instruction, the CPU 51 proceeds to step S42. When the CPU 51 determines that there is no transfer instruction, the CPU 51 ends the process illustrated in FIG. 13.

In step S42, the CPU 51 determines whether there is an accumulated stroke (i.e., accumulated stroke information). This is because the digital pen 40 performs processing to accumulate stroke information, obtained by scanning performed by the scanner 55 until a transfer instruction is given, in the non-volatile memory 54. Thus, the CPU 51 determines whether an accumulated stroke is stored in the non-volatile memory 54. When the CPU 51 determines that there is an accumulated stroke, the CPU 51 proceeds to step S43. When the CPU 51 determines that there is no accumulated stroke, the CPU 51 ends the process illustrated in FIG. 13.

In step S43, the CPU 51 transfers the stroke information accumulated in the non-volatile memory 54 to the host computer 20.

Next in step S44, the CPU 51 deletes the accumulated stroke stored in the non-volatile memory 54. The CPU 51 ends the process illustrated in FIG. 13.

The details of the transfer process are as described above. With the above-described transfer process, in response to transfer of stroke information from the digital pen 40, the host computer 20 generates a password on the basis of the stroke information.

Next, a password generating process performed by the host computer 20 on the basis of the stroke information will be described.

In the password generating process, firstly, the host computer 20 divides the stroke information into stroke sets, and thereafter generates a password on the basis of the divided stroke sets.

Figure 14:
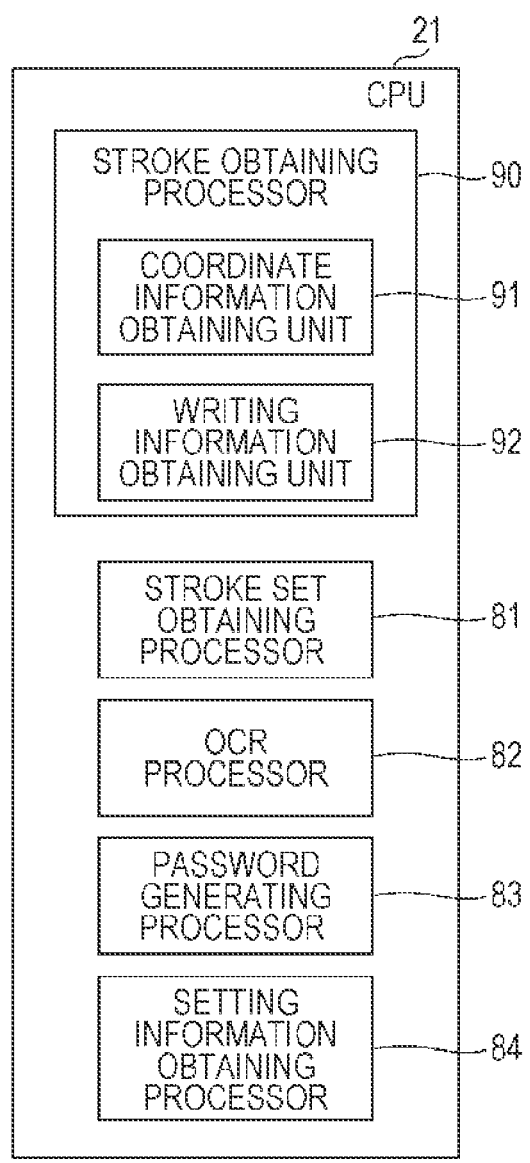
FIG. 14 is a block diagram illustrating an example of the configuration of the host computer for realizing a password generating process.

FIG. 14 illustrates an example of the configuration of the host computer 20 (specifically the CPU 21) for realizing the password generating process.

As illustrated in FIG. 14, the CPU 21 includes, as functions realized by executing a program, a stroke obtaining processor 90, a stroke set obtaining processor 81, an optical character reader (OCR) processor 82, a password generating processor 83, and a setting information obtaining processor 84. Here, the stroke obtaining processor 90 further includes a coordinate information obtaining unit 91 and a writing information obtaining unit 92.

Figure 15:
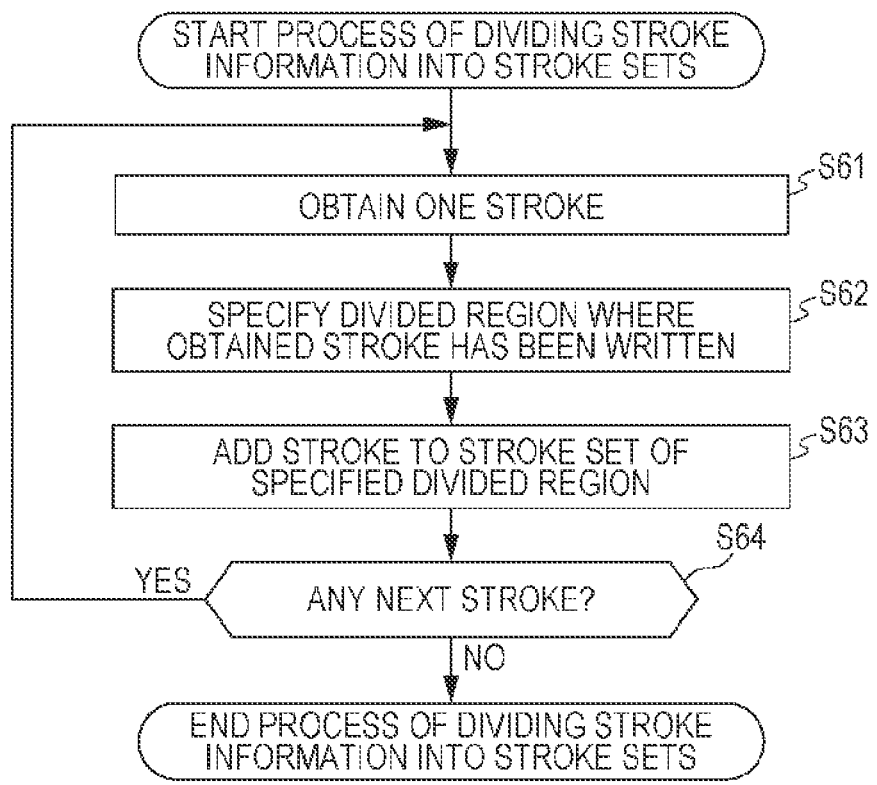
FIG. 15 is a flowchart illustrating an example of a process of dividing stroke information into stroke sets, which serves as the first half process of the password generating process.
Figure 16:
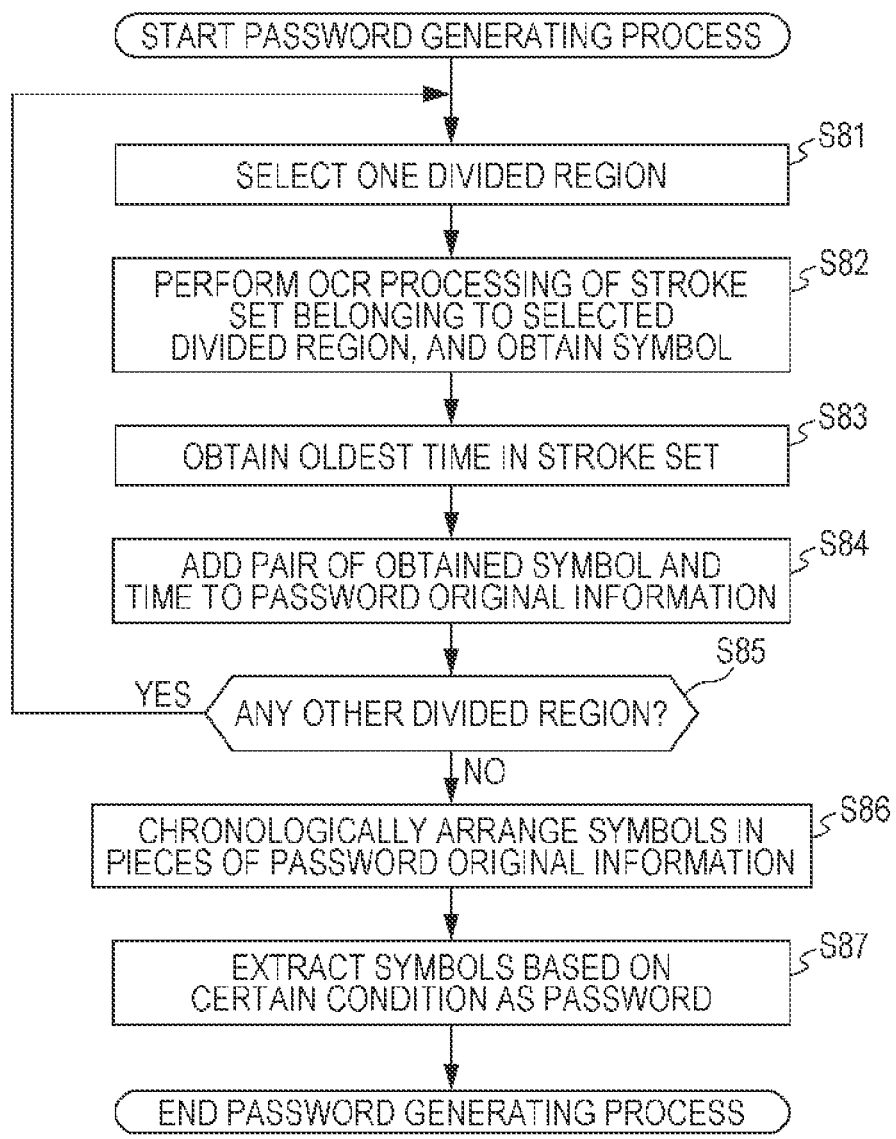
FIG. 16 is a flowchart illustrating an example of a process of generating a password on the basis of the divided stroke sets, which serves as the second half process of the password generating process.

FIG. 15 illustrates a flowchart of an example of a process of dividing stroke information into stroke sets, which serves as the first half process of the password generating process. FIG. 16 illustrates a flowchart of an example of a process of generating a password on the basis of the divided stroke sets, which serves as the second half process of the password generating process. Hereinafter, the details of processing performed by each element of the CPU 21, illustrated in FIG. 14, in accordance with the procedures illustrated in FIGS. 15 and 16 will be described.

Firstly, with reference to FIG. 15, a process of dividing stroke information into stroke sets will be described.

As illustrated in FIG. 15, firstly in step S61, the stroke obtaining processor 90 obtains one stroke, that is, a stroke corresponding to one image constituting a symbol.

Specifically, in step S61, the coordinate information obtaining unit 91 obtains coordinate values (x-coordinate value and y-coordinate value) from coordinate information in the stroke information transmitted from the digital pen 40. Here, in the coordinate information, the coordinate values are associated with the time of writing. The coordinate values correspond to a position through which the digital pen 40 has passed on the information entry form 300 when writing has been performed. In contrast, the writing information obtaining unit 92 obtains the time of writing, from the coordinate information, as writing order specifying information for specifying the order of writing. Here, the time of writing (hereinafter may be simply referred to as "time") is the time at which writing with the digital pen 40 has been performed, that is, the time at which the digital pen 40 has passed through the position (coordinates) when the writing has been performed on the information entry form 300. The stroke obtaining processor 90 obtains a stroke corresponding to one image, on the basis of the coordinates obtained by the coordinate information obtaining unit 91 and the time obtained by the writing information obtaining unit 92. That is, for example, when multiple coordinates are continuous and times corresponding to these coordinates are also continuous, the stroke obtaining processor 90 regards a track obtained by connecting these coordinates as a stroke corresponding to one image.

Next in step S62, the stroke set obtaining processor 81 specifies, among the divided regions included in the password entry area 301, a divided region to which the stroke obtained in step S61 belongs. That is, the stroke set obtaining processor 81 specifies, among the divided regions included in the password entry area 301, a divided region where writing regarding the stroke has been performed. Here, each of the divided regions included in the password entry area 301 is represented as a rectangular shape, and each divided region has the x-coordinate values and the y-coordinate values of the start point and end point thereof. Accordingly, for example, the stroke set obtaining processor 81 specifies a divided region by comparing the coordinate values obtained in step S61 with the x-coordinate values and the y-coordinate values of the start point and end point of each of the divided regions included in the password entry area 301.

Figures 17, 18:
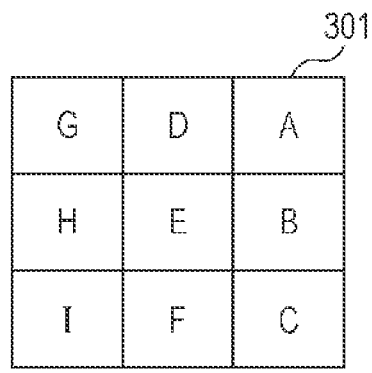
FIG. 17 is a diagram illustrating an example in which names such as A, B, C, . . . , and I are assigned to region names of individual divided regions of the password entry area.
FIG. 18 is a diagram illustrating an example of a table in which the divided regions are associated with OCR results and the order of writing.

FIG. 17 illustrates an example in which names such as A, B, C, . . . and I are assigned to region names of the individual divided regions of the password entry area 301.

In step S62, the stroke set obtaining processor 81 specifies to which of the divided regions illustrated in FIG. 17, the stroke obtained in step S61 belongs. For example, the stroke set obtaining processor 81 specifies, among the divided regions included in the password entry area 301, a divided region to which the stroke obtained in step S61 belongs, by comparing the coordinates serving as the start point of the stroke, that is, the x-coordinate value and the y-coordinate value serving as coordinate values with the oldest time (the most past time) among coordinate values indicating the stroke, with the x-coordinate values and the y-coordinate values of the start point and end point of each of the divided regions included in the password entry area 301 illustrated in FIG. 17.

Next in step S63, the stroke set obtaining processor 81 adds this stroke to a stroke set corresponding to the divided region specified in step S62. That is, the stroke set obtaining processor 81 generates a stroke set by adding the stroke obtained in step S61 in an association with the divided region specified in step S62.

Next in step S64, the stroke set obtaining processor 81 determines whether there is a next stroke. That is, the stroke set obtaining processor 81 determines whether there is another piece of stroke information transmitted from the digital pen 40. When the stroke set obtaining processor 81 determines that there is a next stroke, the stroke set obtaining processor 81 starts the process again from step S61. When the stroke set obtaining processor 81 determines that there is no next stroke, the stroke set obtaining processor 81 ends the process illustrated in FIG. 15.

The details of the process of dividing stroke information into stroke sets are as described above. With this process, for each of the divided regions included in the password entry area 301, the host computer 20 generates a stroke set including multiple strokes belonging to this divided region. When the host computer 20 ends this process, the host computer 20 performs the password generating process.

Next, with reference to FIG. 16, a process of generating a password on the basis of the divided stroke sets will be described.

As illustrated in FIG. 16, firstly in step S81, the password generating processor 83 selects one divided region.

Next in step S82, the OCR processor 82 performs OCR processing of a stroke set (i.e., stroke group) that belongs to the divided region selected in step S81, and obtains a symbol.

Next in step S83, the password generating processor 83 obtains the oldest time in the stroke set from which the symbol has been extracted by performing OCR processing in step S82. That is, the password generating processor 83 obtains the oldest time among times associated with the coordinate values of strokes constituting the stroke set.

Next in step S84, the password generating processor 83 adds a combination of the symbol obtained in step S82 and the time obtained in step S83 to password original information.

FIG. 18 illustrates an example of a table in which each divided region is associated with a symbol (represented as "OCR result" in this example) and the time of writing (represented as the "order of writing" in this example). This example is the case where the names of the divided regions of the password entry area 301 are names such as those illustrated in the example in FIG. 17, and writing has been performed in the password entry area 301 in the order illustrated in FIG. 12.

As illustrated in FIG. 18, the OCR result and the order of writing are associated with each of the divided regions of the password entry area 301.

Next in step S85, the password generating processor 83 determines whether there is a divided region where processing in steps S82 to S84 has not been performed. When the password generating processor 83 determines that there is such another divided region, the password generating processor 83 starts the process again from step S81. When the password generating processor 83 determines that there is no such divided region, the password generating processor 83 proceeds to step S86.

In step S86, the password generating processor 83 chronologically arranges pieces of password original information (specifically symbols included in the pieces of password original information) associated with the divided regions obtained by performing processing in steps S81 to S85.

Next in step S87, the password generating processor 83 obtains a password by extracting, on the basis of a certain condition, symbols from the symbols arranged in step S86. Specifically, the setting information obtaining processor 84 obtains the password length (N symbols) included in the stroke information, and the password generating processor 83 obtains, as a password, a string of N symbols at the head of the symbol string arranged in step S86, in accordance with the password length obtained by the setting information obtaining processor 84. The password generating processor 83 ends the process illustrated in FIG. 16.

For example, as illustrated in FIG. 12, when numerals are written in the password entry area 301, if the password length is 4, the password generating processor 83 generates "6439" as a password.

Operations of First Exemplary Embodiment

Next, a series of operations involved in password generation in the image processing system 1 will be described.

In response to an operation performed by the user, the host computer 20 obtains a form document, and performs data scanning settings (steps S1 to S3). The host computer 20 outputs a print instruction to the image forming apparatus 30 (step S4). At this time, the host computer 20 transmits information entry form data and a sheet ID, which are included in the print instruction, to the document server 6.

Upon receipt of the print instruction from the host computer 20, when the print instruction is a print instruction with a two-dimensional code, the image forming apparatus 30 generates an information entry form image on the basis of the information entry form data included in the print instruction, and generates a two-dimensional code image for specifying the sheet ID included in the print instruction and the coordinates on the medium (steps S21 to S24). The image forming apparatus 30 combines the generated information entry form image and two-dimensional code image, and forms this composite image on the medium (steps S25 and S26). Accordingly, the information entry form 300 combined with the two-dimensional code is obtained.

When writing is performed with the digital pen 40 on this information entry form 300 printed as above, the digital pen 40 transmits, as writing information, stroke information (information included in the two-dimensional code) to the host computer 20 (FIG. 13). Upon receipt of the stroke information from the digital pen 40, the host computer 20 performs various processes using the stroke information. At this time, the host computer 20 performs the following processing of stroke information obtained by writing performed in the password entry area 301 of the information entry form 300.

The host computer 20 obtains one stroke, and specifies a divided region, included in the password entry area 301, to which the obtained stroke belongs (steps S61 and S62). The host computer 20 generates a stroke set by adding the obtained stroke in association with the specified divided region (step S63). The host computer 20 performs various processes, including obtaining a stroke, specifying a divided region to which the obtained stroke belongs, and adding the stroke to a stroke set corresponding to the specified divided region, until there becomes no more stroke, thereby obtaining a stroke set for each of the divided regions included in the password entry area 301 (steps S61 to S64).

Thereafter, the host computer 20 selects the divided regions included in the password entry area 301, one at a time, and performs OCR processing of a stroke set belonging to each of the divided regions, thereby obtaining a symbol written in each of the divided regions (steps S81 and S82). The host computer 20 generates password original information including a pair of each symbol, obtained as above, and the oldest time in the stroke set serving as the base for that symbol (steps S83 and S84). The host computer 20 chronologically arranges symbols in pieces of password original information on the basis of times paired with the symbols, and obtains a password by extracting a symbol string from the arranged symbol string on the basis of a certain condition (steps S86 and S87).

By using the above-described image processing system 1, when a symbol is written with the digital pen 40 in each of the divided regions of the password entry area 301 of the information entry form 300, a string of symbols in accordance with the order of writing is generated as a password.

Accordingly, as illustrated in portion (f) of FIG. 12, even when symbols are written in all the divided regions of the password entry area 301 of the information entry form 300, because the password entry area 301 of the information entry form 300 is not configured to make the order of writing specifiable, the third person who looks at the symbols written in the divided regions of the password entry area 301 of the information entry form 300 is incapable of specifying a string of symbols in the order of writing. Thus, the third person is incapable of specifying a password generated in this system.

Accordingly, the user of the information entry form 300 is able to enable this system to hold and manage a password unspecifiable by the third person by simply writing the password, one character at a time, with the digital pen 40 in any arbitrary regions of the divided regions included in the password entry area 301.

When the password length is 4, as illustrated in portion (f) of FIG. 12, it becomes more difficult for the third person to specify the password from what is written in the password entry area 301 by writing, by the user, numerals in all the divided regions of the password entry area 301.

An exemplary application of such a system is, for example, a bank teller system. In this case, by using the host computer 20 and the digital pen 40, a bank teller asks a customer who wants to open an account to write a password with the digital pen 40 in a password entry area of an application form, which is an information entry form. Accordingly, the host computer 20 is capable of generating and managing a password without allowing even the bank teller to know the password.

Here, an example of writing a password of the related art will be described.

Figure 19:
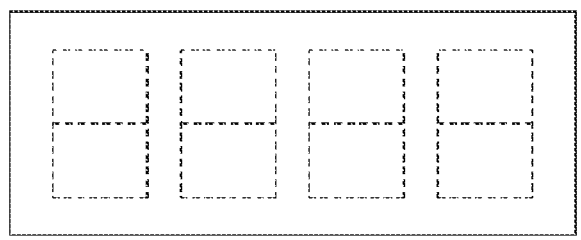
FIG. 19 is a diagram illustrating a password entry space of an example of the related art before numerals are written.
Figure 20:
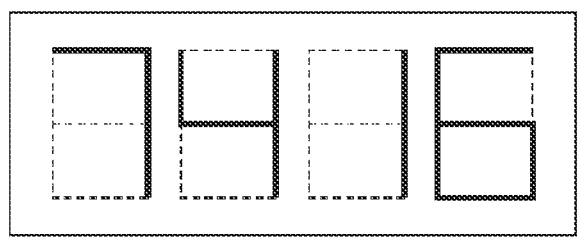
FIG. 20 is a diagram illustrating the password entry space of the example of the related art after numerals are written.

FIGS. 19 and 20 illustrate an example of a password entry space of the related art for generating a password from a four-digit number. FIG. 19 illustrates the password entry space before numerals are written. FIG. 20 illustrates the password entry space after numerals are written.

As illustrated in FIG. 20, when numerals are written, the numeral string "7416", starting with the left hand side, becomes a password. Thus, the third person who looks at this password entry space knows the password from the numeral string written in the password entry space. In the related art, because individual spaces where numerals are written in the password entry space correspond to the order of the numeral string of the password, the password is specified from the numeral string written in the password entry space. In contrast, in this exemplary embodiment, the divided regions of the password entry area 301 do not correspond to the order of the symbol string of the password. Thus, even when numerals are written in the individual divided regions of the password entry area 301, the third person is incapable of specifying a password from what is written in the password entry area 301.

Modifications of First Exemplary Embodiment

In the first exemplary embodiment, the host computer 20 may hold and manage an information entry form and a sheet ID in associated manner, without having a document server.

Although the host computer 20, which gives a print instruction, generates a password in the first exemplary embodiment, the first exemplary embodiment is not limited to this case. For example, in the first exemplary embodiment, a dedicated apparatus that generates a password, such as a password generating server, may generate a password. In this case, the password generating server generates a password on the basis of stroke information transmitted from the digital pen 40. Alternatively, in the first exemplary embodiment, the digital pen 40 may generate a password on the basis of stroke information scanned at the time of writing, without transmitting the stroke information to an external apparatus.

Although the order of writing is specified on the basis of the time of writing performed in the password entry area 301 in the first exemplary embodiment, the first exemplary embodiment is not limited to this case.

In the first exemplary embodiment, the two-dimensional code image is not limited to the configuration illustrated in FIG. 9. That is, the two-dimensional code image is synthesizable at the time of image formation, and the two-dimensional code image may be any image as long as it is scannable by the digital pen 40.

In the first exemplary embodiment, a symbol string output as a password may be a string of multiple symbols arranged in an order based on the order of writing (the order of writing in units of symbols). Here, in the first exemplary embodiment described above, as the example where symbols are extracted on the basis of a certain condition from the obtained symbol string (symbol string obtained in step S86), a string of N symbols at with the head of the obtained symbol string is extracted. In this example, a string of N symbols at the head of the symbol string is extracted in the order of writing, as it is, in units of symbols, and the extracted symbol string serves as a password. Besides such an example, in the first exemplary embodiment, for example, a string of N symbols at the end of the symbol string may be extracted as a password. Alternatively, in the first exemplary embodiment, symbols in a particular order may be extracted, with respect to the order of entry of symbols in the password entry area 301. That is, in the first exemplary embodiment, a string of symbols obtained by re-arranging a string of symbols that is in the original order of writing, as it is, in units of symbols may serve as a password. In such a case, for example, on the information entry form 300 with the password entry area 301, an entry area for selecting which of the symbols in the order of entry is/are used as a password (such as a password selecting order entry area) is provided.

In the first exemplary embodiment, the stroke information includes the password length. That is, in the first exemplary embodiment, the password length is set at the time the data scanning settings of the information entry form 300 are performed. However, the first exemplary embodiment is not limited to this case. For example, information of the password length may be registered in advance in a processor which performs the password generating process (the host computer 20 in this exemplary embodiment). In this case, the setting information obtaining processor 84 obtains the information of the password length, registered in advance as above, from a certain storage region.

In the first exemplary embodiment, information of the divided regions (such as the number and shapes of the divided regions) may be set at the time the data scanning settings of the information entry form 300 are performed. In this case, since information of the divided regions is included in the stroke information from the digital pen 40, the setting information obtaining processor 84 obtains the information of the divided regions from the stroke information. Accordingly, the stroke set obtaining processor 81 generates stroke sets on the basis of the obtained information of the divided regions.

Second Exemplary Embodiment

Next, a second exemplary embodiment will be described. Note that the same or similar configuration to the first exemplary embodiment described above is given the same reference numerals, and descriptions thereof are given.

Figure 21:
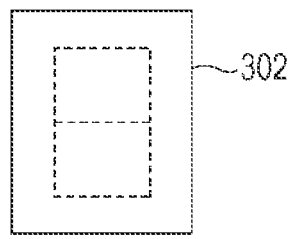
FIG. 21 is a diagram illustrating an example of a password entry area that is not divided and that includes only one region in an example of a second exemplary embodiment.

In the second exemplary embodiment, a password is generated on the basis of writing performed in a password entry area 302 including only one region, which is not divided, as illustrated in FIG. 21.

Figure 22:
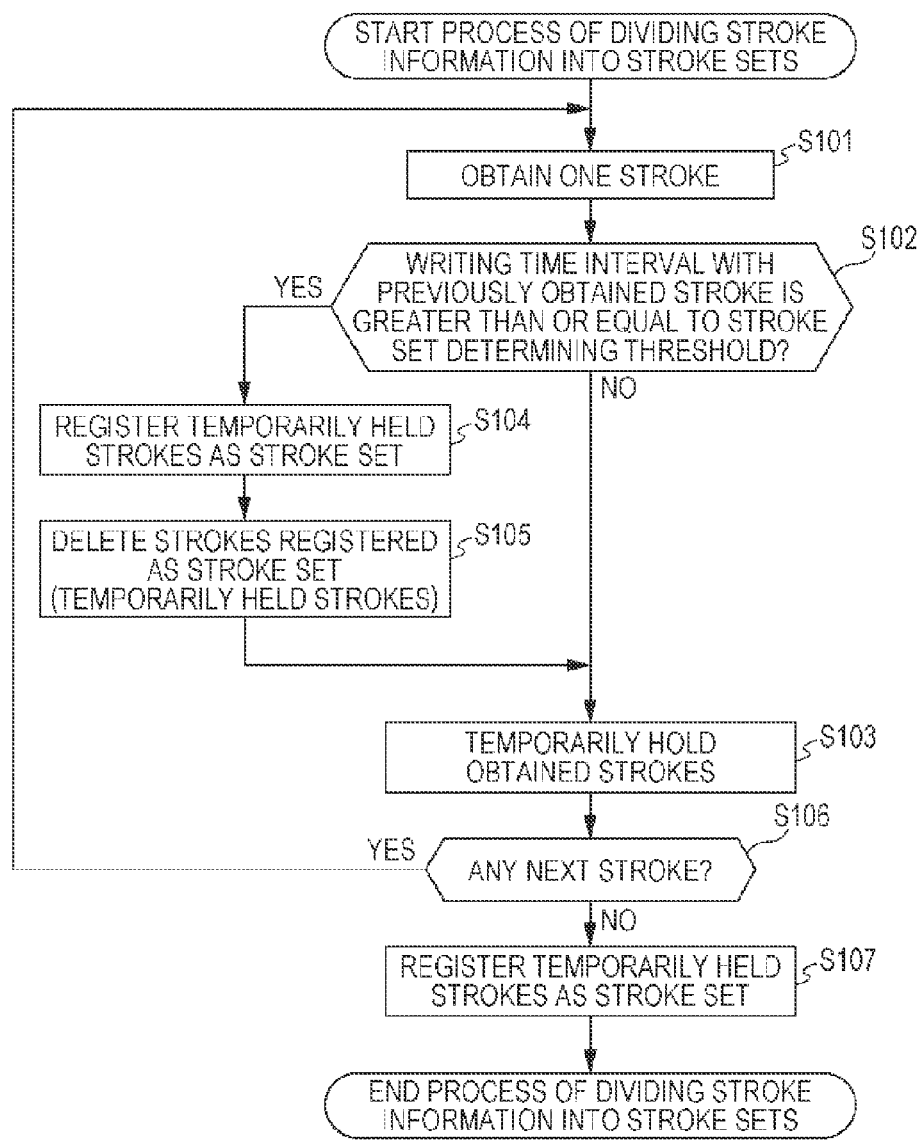
FIG. 22 is a flowchart illustrating an example of a process of dividing stoke information into stroke sets, which serves as the first half process of a password generating process according to the second exemplary embodiment.

FIG. 22 illustrates a flowchart of an example of a process of dividing stroke information into stroke sets, which serves as the first half process of a password generating process according to the second exemplary embodiment.

As illustrated in FIG. 22, firstly in step S101, the stroke obtaining processor 90 obtains one stroke, that is, a stroke corresponding to one image constituting a symbol, as in processing performed in step S61.

Next in step S102, the stroke set obtaining processor 81 determines whether the writing time interval between the stroke obtained in step S101 in processing performed this time and the stroke obtained in step S101 in processing performed the previous time (hereinafter referred to as "writing time interval between strokes") is greater than or equal to a stroke set determining threshold. Here, the stroke set determining threshold is a threshold for determining whether these strokes obtained in processing performed this time and the previous time constitute the same stroke set. For example, the stroke set determining threshold is a value set in advance on the basis of an experiment, experience, or logic.

When the stroke set obtaining processor 81 determines that the writing time interval between strokes is greater than or equal to the stroke set determining threshold, it is regarded that the stroke obtained in processing performed this time and the stroke obtained in processing performed the previous time constitute images of different symbols, and the stroke set obtaining processor 81 proceeds to step S104. When the stroke set obtaining processor 81 determines that the writing time interval between strokes is less than the stroke set determining threshold, it is regarded that the stroke obtained in processing performed this time and the stroke obtained in processing performed the previous time constitute any one image of the same symbol, and the stroke set obtaining processor 81 proceeds to step S103.

In step S103, the stroke set obtaining processor 81 temporarily holds the strokes obtained in step S101 (for example, temporarily holds the strokes on the magnetic storage device 23 or the RAM 24).

Next in step S106, the stroke set obtaining processor 81 determines whether there is a next stroke. When the stroke set obtaining processor 81 determines that there is a next stroke, the stroke set obtaining processor 81 starts the process again from step S101. When the stroke set obtaining processor 81 determines that there is no next stroke, the stroke set obtaining processor 81 proceeds to step S107.

In step S104, the stroke set obtaining processor 81 registers the temporarily held strokes as a stroke set (for example, stores the strokes as a stroke set on the magnetic storage device 23 or the RAM 24).

Next in step S105, the stroke set obtaining processor 81 deletes the strokes registered as a stroke set in step S104. That is, the stroke set obtaining processor 81 deletes the temporarily held strokes. The stroke set obtaining processor 81 proceeds to step S103.

Here, when strokes are consecutively obtained, as long as the writing time interval between strokes, which is obtained one after another, is greater than or equal to the stroke set determining threshold, that is, as long as the writing time interval between the stroke obtained in processing performed this time and the stroke obtained in processing performed the previous time is greater than or equal to the stroke set determining threshold, the stroke set obtaining processor 81 temporarily holds these strokes (steps S101 to S103, and S106). When the writing time interval between strokes becomes less than the stroke set determining threshold, the stroke set obtaining processor 81 registers the strokes held up to that time as a stroke set, and deletes these strokes (steps S102, S104, and S105). The stroke set obtaining processor 81 temporarily holds the most recently obtained stroke (step S103).

In step S107, the stroke set obtaining processor 81 registers the temporarily held strokes as a stroke set. The stroke set obtaining processor 81 ends the process illustrated in FIG. 22.

The details of the process of dividing stroke information into stroke sets are as described above.

Figure 23:
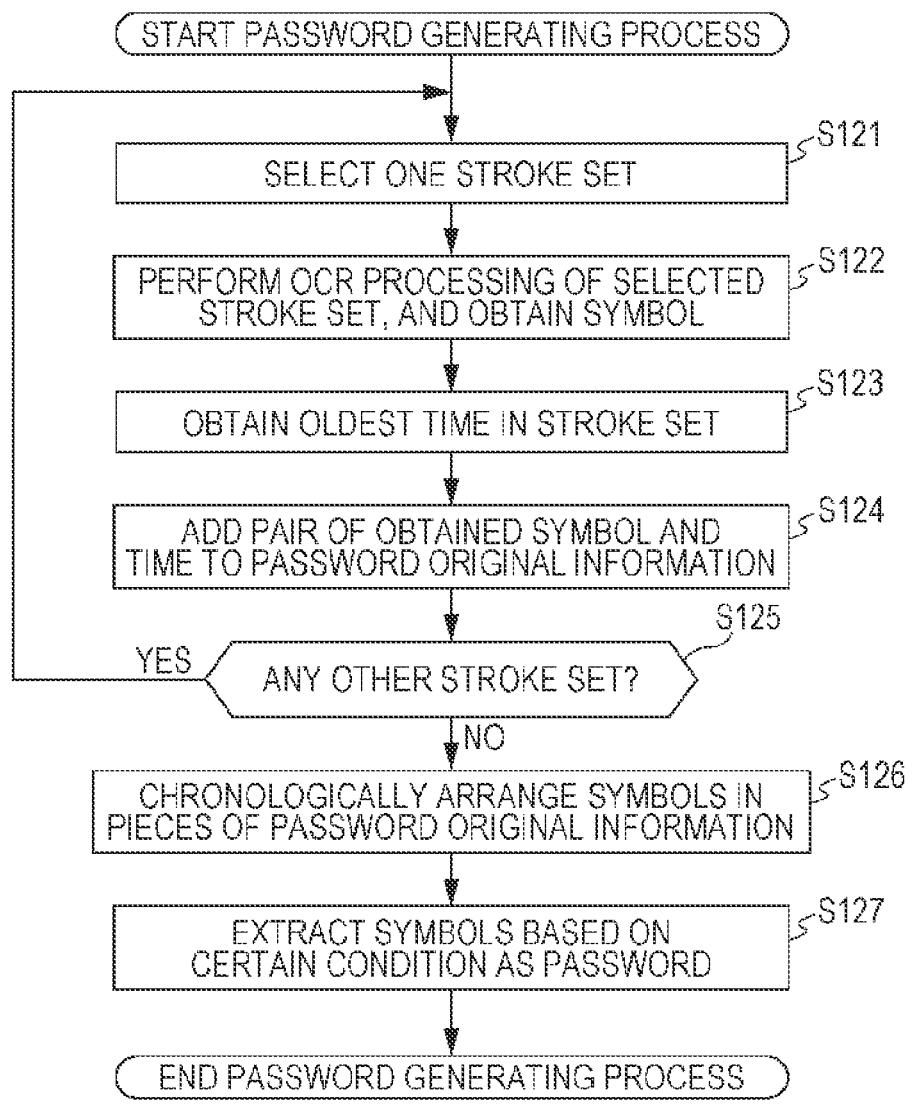
FIG. 23 is a flowchart illustrating an example of a process of generating a password on the basis of the divided stroke sets, which serves as the second half process of the password generating process according to the second exemplary embodiment.

FIG. 23 illustrates a flowchart of an example of a process of generating a password on the basis of the registered stroke sets, which serves as the second half process of the password generating process according to the second exemplary embodiment.

As illustrated in FIG. 23, firstly in step S121, the password generating processor 83 selects one stroke set registered in the first half process.

Next in step S122, the OCR processor 82 performs OCR processing of the stroke set selected in step S121, and obtains a symbol.

Next in step S123, the password generating processor 83 obtains the oldest time in the stroke set from which the symbol has been extracted by performing OCR processing in step S122, as in processing performed in step S81. That is, the password generating processor 83 obtains the oldest time among times associated with the coordinate values of strokes constituting the stroke set.

Next in step S124, the password generating processor 83 adds a combination of the symbol obtained in step S122 and the time obtained in step S123 to password original information.

Next in step S125, the password generating processor 83 determines whether there is any other stroke set. When the password generating processor 83 determines that there is another stroke set, the password generating processor 83 starts the process again from step S121. When the password generating processor 83 determines that there is no other stroke set, the password generating processor 83 proceeds to step S126.

In step S126, the password generating processor 83 chronologically arranges pieces of password original information (specifically symbols included in the pieces of password original information) obtained by performing processing in steps S121 to S125.

Next in step S127, the password generating processor 83 obtains a password by extracting symbols on the basis of a certain condition. Specifically, the setting information obtaining processor 84 obtains the password length (N symbols) included in the stroke information, and the password generating processor 83 obtains, as a password, a string of N symbols at the head of the symbol string arranged in step S126, in accordance with the password length obtained by the setting information obtaining processor 84. The password generating processor 83 ends the process illustrated in FIG. 23.

For example, when "1", "2", "3", and "4" are written one over another in the password entry area 302 including only one region, the password generating processor 83 generates "1234" as a password.

The above description is for the configuration of the second exemplary embodiment. The other configuration of the second exemplary embodiment is the same as or similar to the configuration of the first exemplary embodiment described above.

Operation of Second Exemplary Embodiment

Particularly in the second exemplary embodiment, the host computer 20 performs the following processing for stroke information obtained by writing performed in the password entry area 302, which includes only one region, of an information entry form.

The host computer 20 obtains strokes, one at a time, and temporarily holds the sequentially obtained strokes as long as the writing time interval between strokes is less than the stroke set determining threshold (steps S101 to S103). When the writing time interval between strokes becomes greater than or equal to the stroke set determining threshold, the host computer 20 registers the strokes, temporarily held up to that time, as a stroke set, and deletes these strokes (steps S102, S104, and S105). Thereafter, when there becomes no next stroke, the host computer 20 registers the temporarily held strokes, which constitute the symbol written at last, as a stroke set (steps S106 and S107).

Thereafter, the host computer 20 selects the registered stroke sets, one at a time, performs OCR processing of the sequentially selected stroke sets, and obtains symbols, one at a time (steps S121 and S122). The host computer 20 generates password original information including a pair of each symbol, obtained as above, and the oldest time in the stroke set serving as the base for that symbol (steps S123 and S124). The host computer 20 chronologically arranges symbols in pieces of password original information on the basis of times paired with the symbols, and obtains a password by extracting a symbol string from the arranged symbol string on the basis of a certain condition (steps S126 and S127).

By using the above-described image processing system 1, when symbols are written with the digital pen 40 one over another in the password entry area 302 of the information entry form, a string of symbols in accordance with the order of writing is generated as a password.

Figure 24:
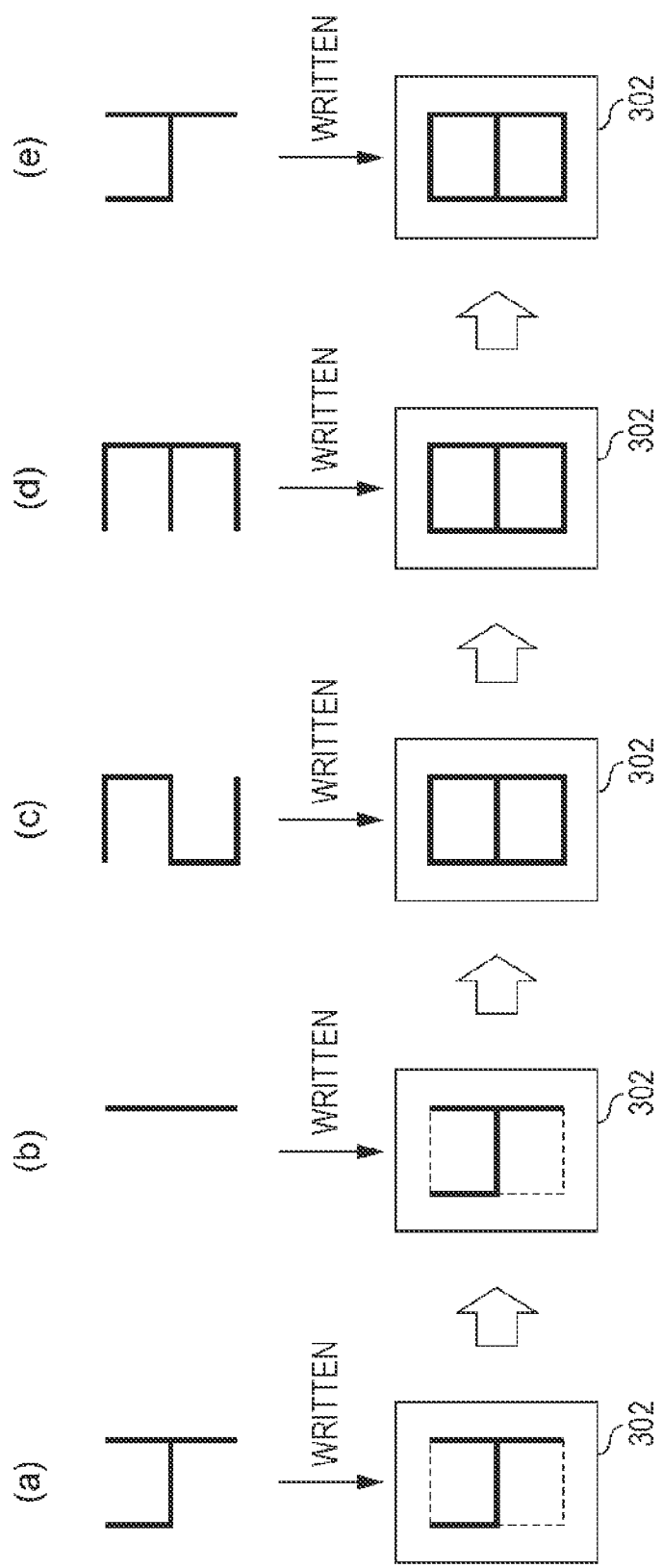
FIG. 24 includes diagrams illustrating changes in an entry state of the password entry area, which includes only one region, in response to writing numerals in the password entry area.

FIG. 24 illustrates changes in the entry state of the password entry area 302, which includes only one region, as illustrated in FIG. 21, in response to writing numerals in the password entry area 302.

As illustrated as changes from portions (a) to (e) of FIG. 24, when "4", "1", "2", "3", and "4" are sequentially written one over another in the password entry area 302, handwriting is superimposed one after another. Therefore, the third person who looks at the password entry area 302 is incapable of specifying the symbols written in the password entry area 302. Thus, the third person is incapable of specifying a password generated in this system.

Accordingly, the user of the information entry form is able to enable this system to hold and manage a password unspecifiable by the third person by simply writing the password, one character at a time, with the digital pen 40 in the password entry area 302.

In the description of the first and second exemplary embodiments above, the digital pen 40 constitutes, for example, a scanner. The coordinate information obtaining unit 91 constitutes, for example, a coordinate obtaining unit. The stroke obtaining processor 90 constitutes, for example, a track obtaining unit. The stroke set obtaining processor 81 constitutes, for example, a dividing unit. The OCR processor 82 constitutes, for example, a converter. The password generating processor 83 constitutes, for example, an output unit. The setting information obtaining processor 84 constitutes, for example, a number-of-symbol information obtaining unit and a region information obtaining unit.

Modifications of Second Exemplary Embodiment

Although symbols are separated on the basis of the writing time interval between strokes in the second exemplary embodiment, the second exemplary embodiment is not limited to this case. For example, in the second exemplary embodiment, the digital pen 40 may include a switch or the like, and symbols may be separated in response to a switch operation performed every time a character is written. Alternatively, a particular region may be provided in the information entry form, and symbols may be separated in response to writing (for example, in response to writing of a particular code (such as a period or a comma) for separating symbols) performed in that particular region. That is, when the host computer 20 detects that the particular code is written in the particular region on the basis of stroke information, the host computer 20 separates strokes into a before-detection group and an after-detection group, and registers stroke sets.

In the second exemplary embodiment, a numeral written at the beginning of the password entry area 302 may be processed as a password length. Thus, in the example illustrated in FIG. 24, because "4" is written at the beginning of the password entry area 302, "4" serves as the password length, and "1, 2, 3, and 4" sequentially written thereafter one over another serves as a password.

Also in the second exemplary embodiment, the modifications of the first exemplary embodiment are applicable as long as they are applicable as modifications.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A password generating system comprising:
    a scanner including a stylus part that performs writing on a print medium on which a code indicating coordinates is added at least to a password setting region, the scanner scanning the code at a writing position at the time of writing performed with the stylus part in the password setting region;
    a coordinate obtaining unit that obtains the coordinates from the code;
    a writing information obtaining unit that obtains writing information that specifies the order of writing;
    a track obtaining unit that obtains the track of writing in the password setting region, on the basis of the coordinates obtained by the coordinate obtaining unit and the writing information obtained by the writing information obtaining unit;
    a dividing unit that divides a plurality of tracks obtained by the track obtaining unit into units convertible to symbols;
    a converter that converts the track in each of the units, obtained by division performed by the diving unit, into a symbol; and
    an output unit that obtains a symbol string by arranging a plurality of symbols, obtained by conversion performed by the converter, in an order based on the order of writing, and outputs the symbol string as a password.

2. The password generating system according to claim 1, further comprising a number-of-symbol information obtaining unit that obtains information of the number of symbols constituting a password at the time the password is generated,
    wherein the output unit outputs, as a password, a symbol string including symbols that are in an order based on the order of writing and that correspond to the number of symbols obtained by the number-of-symbol information obtaining unit.

3. The password generating system according to claim 1, wherein the output unit obtains a symbol string by arranging some of the plurality of symbols, obtained by conversion performed by the converter, in an order based on the order of writing, and outputs the symbol string as a password.

4. The password generating system according to claim 2, wherein the output unit obtains a symbol string by arranging some of the plurality of symbols, obtained by conversion performed by the converter, in an order based on the order of writing, and outputs the symbol string as a password.

5. The password generating system according to claim 1, wherein the password setting region includes a plurality of regions, and
wherein the dividing unit performs division by regarding, among the plurality of tracks obtained by the track obtaining unit, tracks belonging to the same region in the password setting region as one of the units convertible to symbols.

6. The password generating system according to claim 2, wherein the password setting region includes a plurality of regions, and
wherein the dividing unit performs division by regarding, among the plurality of tracks obtained by the track obtaining unit, tracks belonging to the same region in the password setting region as one of the units convertible to symbols.

7. The password generating system according to claim 3, wherein the password setting region includes a plurality of regions, and
wherein the dividing unit performs division by regarding, among the plurality of tracks obtained by the track obtaining unit, tracks belonging to the same region in the password setting region as one of the units convertible to symbols.

8. The password generating system according to claim 4, wherein the password setting region includes a plurality of regions, and
wherein the dividing unit performs division by regarding, among the plurality of tracks obtained by the track obtaining unit, tracks belonging to the same region in the password setting region as one of the units convertible to symbols.

9. The password generating system according to claim 5, further comprising a region information obtaining unit that obtains information of the plurality of regions included in the password setting region,
wherein the dividing unit specifies modes of the plurality of regions from the information of the plurality of regions, obtained by the region information obtaining unit, and determines whether the tracks belong to the regions.

10. The password generating system according to claim 6, further comprising a region information obtaining unit that obtains information of the plurality of regions included in the password setting region,
wherein the dividing unit specifies modes of the plurality of regions from the information of the plurality of regions, obtained by the region information obtaining unit, and determines whether the tracks belong to the regions.

11. The password generating system according to claim 7, further comprising a region information obtaining unit that obtains information of the plurality of regions included in the password setting region,
wherein the dividing unit specifies modes of the plurality of regions from the information of the plurality of regions, obtained by the region information obtaining unit, and determines whether the tracks belong to the regions.

12. The password generating system according to claim 8, further comprising a region information obtaining unit that obtains information of the plurality of regions included in the password setting region,
wherein the dividing unit specifies modes of the plurality of regions from the information of the plurality of regions, obtained by the region information obtaining unit, and determines whether the tracks belong to the regions.

13. The password generating system according to claim 1, wherein the password setting region is constituted as a single region, and
wherein the track obtaining unit obtains a plurality of tracks written over one another in the password setting region, on the basis of the coordinates obtained by the coordinate obtaining unit and the writing information obtained by the writing information obtaining unit.

14. The password generating system according to claim 2, wherein the password setting region is constituted as a single region, and
wherein the track obtaining unit obtains a plurality of tracks written over one another in the password setting region, on the basis of the coordinates obtained by the coordinate obtaining unit and the writing information obtained by the writing information obtaining unit.

15. The password generating system according to claim 3, wherein the password setting region is constituted as a single region, and
wherein the track obtaining unit obtains a plurality of tracks written over one another in the password setting region, on the basis of the coordinates obtained by the coordinate obtaining unit and the writing information obtained by the writing information obtaining unit.

16. The password generating system according to claim 4, wherein the password setting region is constituted as a single region, and
wherein the track obtaining unit obtains a plurality of tracks written over one another in the password setting region, on the basis of the coordinates obtained by the coordinate obtaining unit and the writing information obtained by the writing information obtaining unit.

17. The password generating system according to claim 13, wherein the dividing unit divides the plurality of tracks obtained by the track obtaining unit into the units convertible to symbols, on the basis of a time interval between tracks when the plurality of tracks obtained by the track obtaining unit are chronologically arranged in the order of writing in the password setting region.

18. The password generating system according to claim 13, wherein the dividing unit divides the plurality of tracks into the units convertible to symbols, on the basis of information written with the stylus part in a region outside the password setting region.

19. A non-transitory computer readable medium storing a program causing a computer to execute a process, the process comprising:
obtaining coordinates from a code that indicates coordinates and that is added at least to a password setting region on a print medium, the code being scanned at a writing position at the time of writing performed with a stylus part in the password setting region;
obtaining writing information that specifies the order of writing;
obtaining the track of writing in the password setting region, on the basis of the obtained coordinates and the obtained writing information;
dividing a plurality of obtained tracks into units convertible to symbols;

converting the track in each of the units, obtained by division, into a symbol; and obtaining a symbol string by arranging a plurality of symbols, obtained by conversion, in an order based on the order of writing, and outputting the symbol string as a password.

20. A password generating method comprising:

obtaining coordinates from a code that indicates coordinates and that is added at least to a password setting region on a print medium, the code being scanned at a writing position at the time of writing performed with a stylus part in the password setting region;

obtaining writing information that specifies the order of writing;

obtaining the track of writing in the password setting region, on the basis of the obtained coordinates and the obtained writing information;

dividing a plurality of obtained tracks into units convertible to symbols;

converting the track in each of the units, obtained by division, into a symbol; and obtaining a symbol string by arranging a plurality of symbols, obtained by conversion, in an order based on the order of writing, and outputting the symbol string as a password.

* * * * *